Patented Sept. 11, 1928.

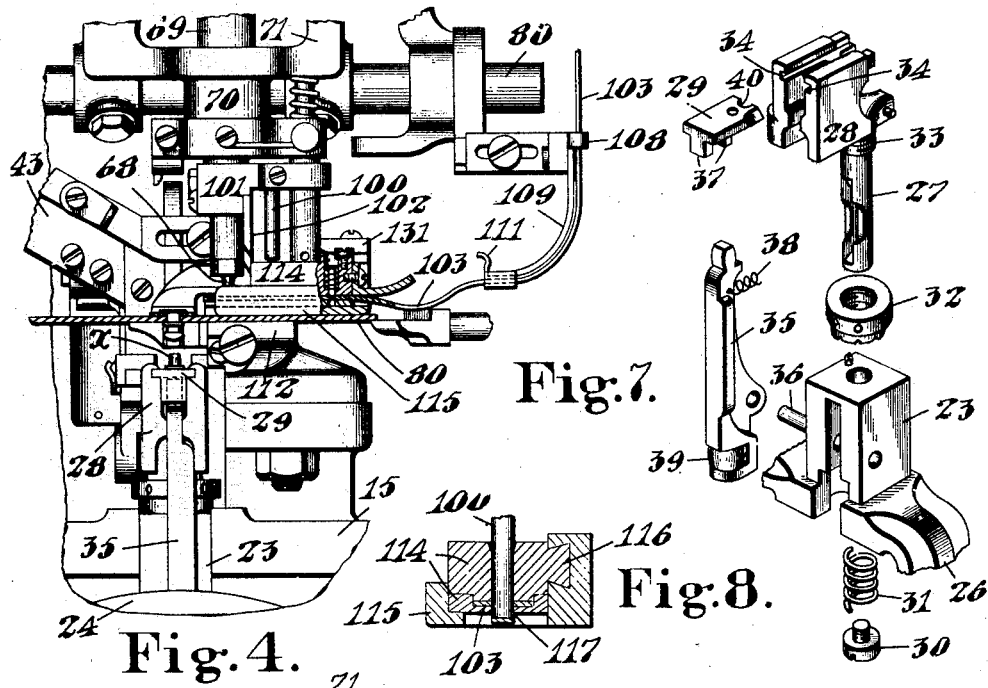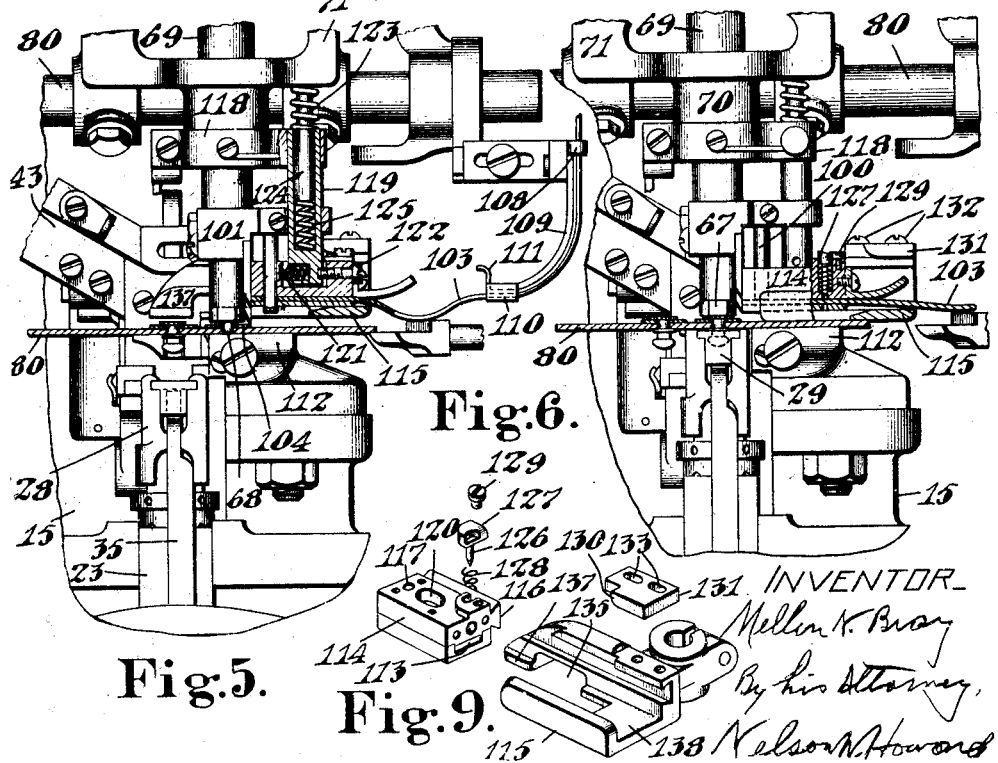

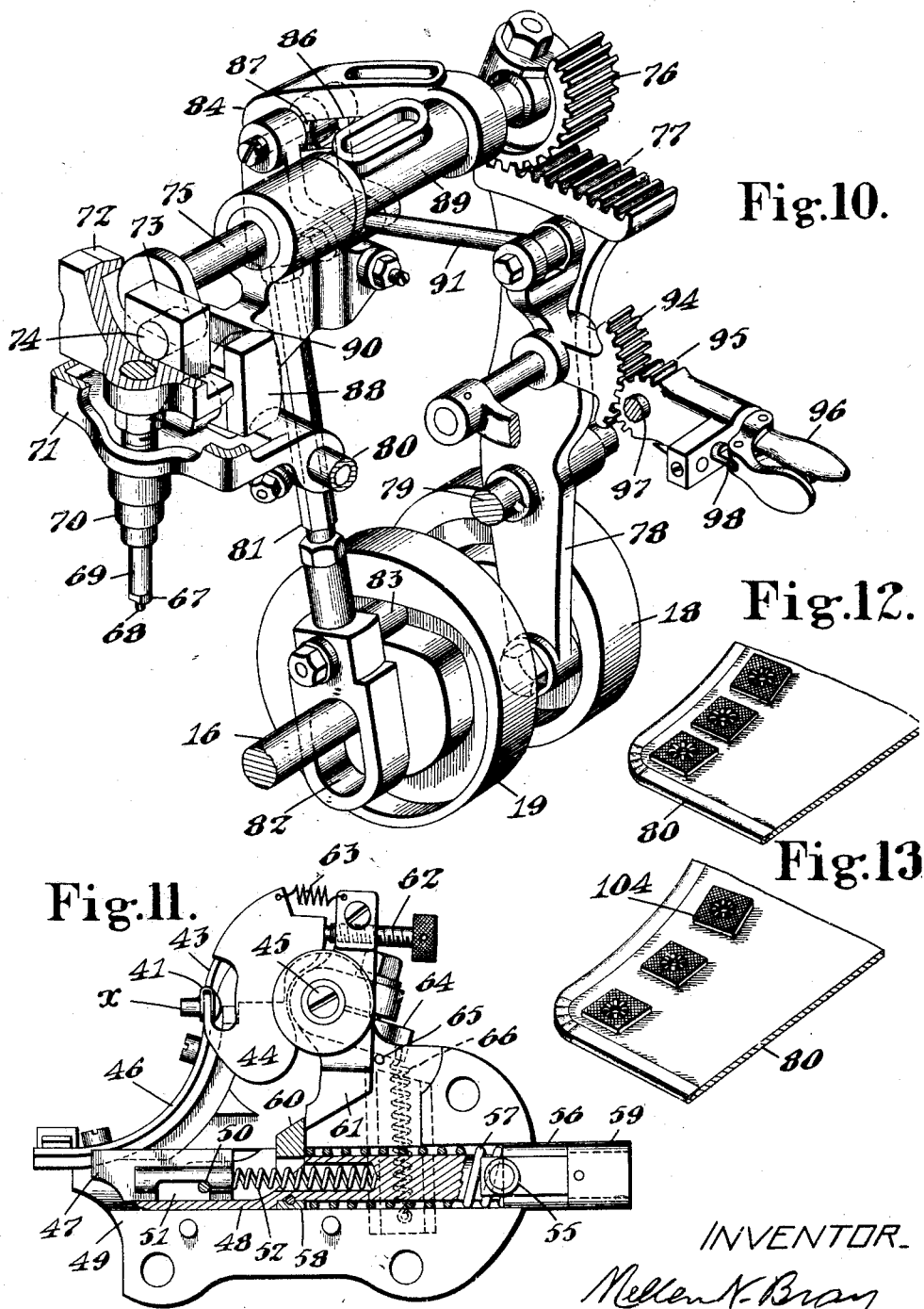

1,683,652

UNITED STATES PATENT OFFICE.

MELLEN N. BRAY, OF BOSTON, MASSACHUSETTS, ASSIGNOR TO TUBULAR RIVET & STUD COMPANY, OF BOSTON, MASSACHUSETTS, A CORPORATION OF MASSACHUSETTS.

FASTENER-INSERTING MACHINE.

Application filed October 10, 1927. Serial No. 225,267.

This invention relates to fastener-inserting machines and is herein illustrated as embodied in a machine for inserting lacing-hooks in articles of work, for example shoe uppers.

Because of the strains to which lacing-hooks are subjected by the lacings, it is customary, in manufacturing shoes, to reinforce the uppers at the hook-receiving portions with pieces of non-elastic, woven fabric laid against the inner surface of the upper leather, and to clench the barrels of the hooks upon these reinforcing elements. The clenched portions of the hooks and the reinforcing pieces are subsequently covered by stitching inner facing strips to the upper. Former developments in this branch of the art provide means for automatically presenting a strip of reinforcing material to the hook-inserting mechanism of machines of the type mentioned, and means for severing the strip into individual sections, usually about one-half inch square, so that each hook will be provided with one of them. In all such machines heretofore provided the reinforcing material has been presented in an unperforated condition to a combined punch and clenching tool of the hook-inserting mechanism, to be punched by said tool as the latter punches holes in the upper for the reception of the lacing-hooks. Nevertheless, certain objections arise from using such a punch to punch holes in the woven fabric provided for reinforcement. Since the punching portion of a combined punch and clenching tool must be small enough to enter the smaller end of the barrel portion of the hook, the holes punched by such a tool for the reception of the hooks are considerably smaller than the outer diameters of the barrel portions of the hooks. As the fabric used for the reinforcement has no appreciable elasticity, it follows that when the barrels of the hooks are forced through these under-sized holes the reinforcing fabric, instead of stretching, is drawn to a funnel-shape, and the protruding formation thus developed forms a lump under the clenched portion of the barrel and this in turn causes so much protrusion of the clenched portion that the lump formed by the latter can be felt through the inner facing by the wearer of the shoe.

Again, when the reinforcing fabric is punched as formerly while it lies upon the upper leather, the hole punched in the reinforcing fabric is not clean-cut. This is due in part to the resilience of the leather backing and in part to the fact that the punch, by reason of the other functions it has to perform, does not have a sharp cutting edge, since a sharp cutting edge would be dulled, if not broken, by the pressure with which it is forced against the punch-bed.

In view of the conditions described above, an object of the present invention is to provide, in a fastener-inserting machine of the type mentioned, improved means for punching fastener-receiving holes in the material used to reinforce the anchorage of the inserted fasteners. Another object closely related thereto is to provide means for punching holes in the reinforcing material larger than the holes punched in the upper, to the end that the holes punched in the reinforcing material may be as large as the outer diameters of the shanks of the hooks, or, if preferred, of any other desired size irrespective of the size of the holes punched in the material to be reinforced.

Accordingly, a feature of the invention consists in means arranged to punch fastener-receiving holes successively and exclusively in a strip of reinforcing material, and means arranged to feed the strip to place said holes successively in register with the punch of the fastener-inserting mechanism. In the illustrated machine the said means for punching the reinforcing material comprises a punch-and-die couple which operates with a shearing action and which is adapted to effect a clean cut, since the fact that the die member is formed with a hole to receive the punch provides for the use of sharp shearing edges on both members.

In machines of the type referred to, it is customary to provide means for automatically severing the reinforcing material into individual sections, partly to avoid wasting reinforcing material and partly to preserve in the highest degree the flexibility of the upper. Accordingly, the machine illustrated herein is also provided with strip-severing means arranged to sever a section of the strip that has been fed into register with the punch of the fastener-inserting mechanism. As herein shown, and in accordance with another feature of the invention, the punch for operating on the reinforcing strip individually, the punch for perforating the upper, and the cutter for severing the reinforcing strip, are all carried and actuated by one plunger.

In accordance with custom, the illustrated machine is provided also with work-feeding mechanism capable of being regulated to vary the spacing of the lacing-hooks, as may be required by shoes of various sizes or by the number of lacing-hooks to be inserted in each shoe. Nevertheless, the sections of reinforcing material need not be any longer when the lacing-hooks are spaced relatively far apart than when they are relatively close to each other, and in the interest of economy of reinforcing material it is desirable to sever the sections of reinforcing material all to one length irrespective of the spacing of the lacing-hooks. Accordingly, another object of the invention is to provide improved means for measuring the sections of reinforcing material all to one length, whether the feeding means be regulated to effect relatively long feeding steps of the upper or relatively short feeding steps. To this end a feature of the invention consists in strip-feeding means operated by the upper-feeding means to feed the strip forward with the same amplitude of movement as that imparted to the upper, and regulatable means for causing the strip-feeding means to feed the strip in the opposite direction, after each forward step, a relatively short distance equal in every case to the difference between the length of the forward step and the desired length of the individual sections. Thus, while both the forward steps and the relatively short reverse steps imparted to the strip are varied by regulations of the upper-feeding means, they are varied equally, with the result that the net feed of the strip is always constant and insures a constant length of the individual sections.

The operator of a machine for inserting lacing-hooks usually sits at the machine and places a stock of shoe uppers in his lap, and as each piece of work is finished he lays it aside and picks up another from the stack in his lap and places it on the work support of the machine. In machines of this type the lacing-hook-inserting means comprises a horizontal plate to which each lacing-hook is delivered from a raceway and by which the hook is raised and inserted into the work. Following the insertion of each hook this plate, which is at the front of the machine, must be retracted from the throat of the clenched hook by movement toward the operator, and the mechanism for so moving the plate is customarily located in front of the hook-inserting plunger and therefore adjacent to the path of travel of the uppers as they are raised from the operator's lap to the work support. In prior machines this mechanism for retracting the plate has projected so far toward the operator as to overhang the stack of uppers lying in his lap, and has retarded production by interfering with the lifting of the uppers from the stack to the work-plate. In view of this condition, a still further object of the invention is to do away with the objectionable overhang of the mechanism for retracting the hook-supporting plate, so that said mechanism will not prevent lifting the uppers from the stack in the most convenient and most direct path.

Accordingly, in the illustrated machine, the motion for retracting the hook-supporting plate is communicated thereto from a cam by a single element, namely, a lever carried up and down relatively to said cam by said plunger and arranged to engage both the cam and the plate. This form of mechanism not only eliminates the aforesaid overhang, but also provides for maintaining the lever in operative engagement with both the hook-supporting plate and the cam without articulating the lever.

The invention also provides other improvements which are hereinafter described and claimed and illustrated in the drawings.

Referring to the drawings,

Fig. 4 is a front elevation, partly in section, of the elements adjacent to the hook-inserting locality in their initial positions;

Fig. 5 is a view similar to Fig. 4 showing the punches as having just completed their punching motion;

Fig. 6 is a view, similar to Figs. 4 and 5, showing a subsequent stage in the cycle of operations;

Fig. 7 is a perspective view including a portion of the lower plunger of the hook-inserting mechanism and various parts carried by said plunger.

Fig. 8 is a vertical cross-section through the presser-foot and the punch-and-die couple by which the strip of reinforcing material is punched prior to its presentation of fastener-inserting mechanism;

Fig. 9 is a perspective view of the presser-foot and parts carried thereby for feeding the strip of reinforcing material;

Fig. 10 is a perspective view of regulatable work-feeding mechanism and mechanism for operating a combined punch and clenching tool;

Fig. 11 is an elevation, partly in section, of mechanism for separating the lacing-hooks and delivering them to the hook-inserting mechanism; and Figs. 12 and 13 are perspective views of portions of quarters of shoe uppers fitted with lacing-hooks and individual sections of reinforcing material, the lacing-hooks and reinforcing sections in Fig. 12 being relatively close to each other, while those in Fig. 13 are spaced farther apart.

Figure 1:
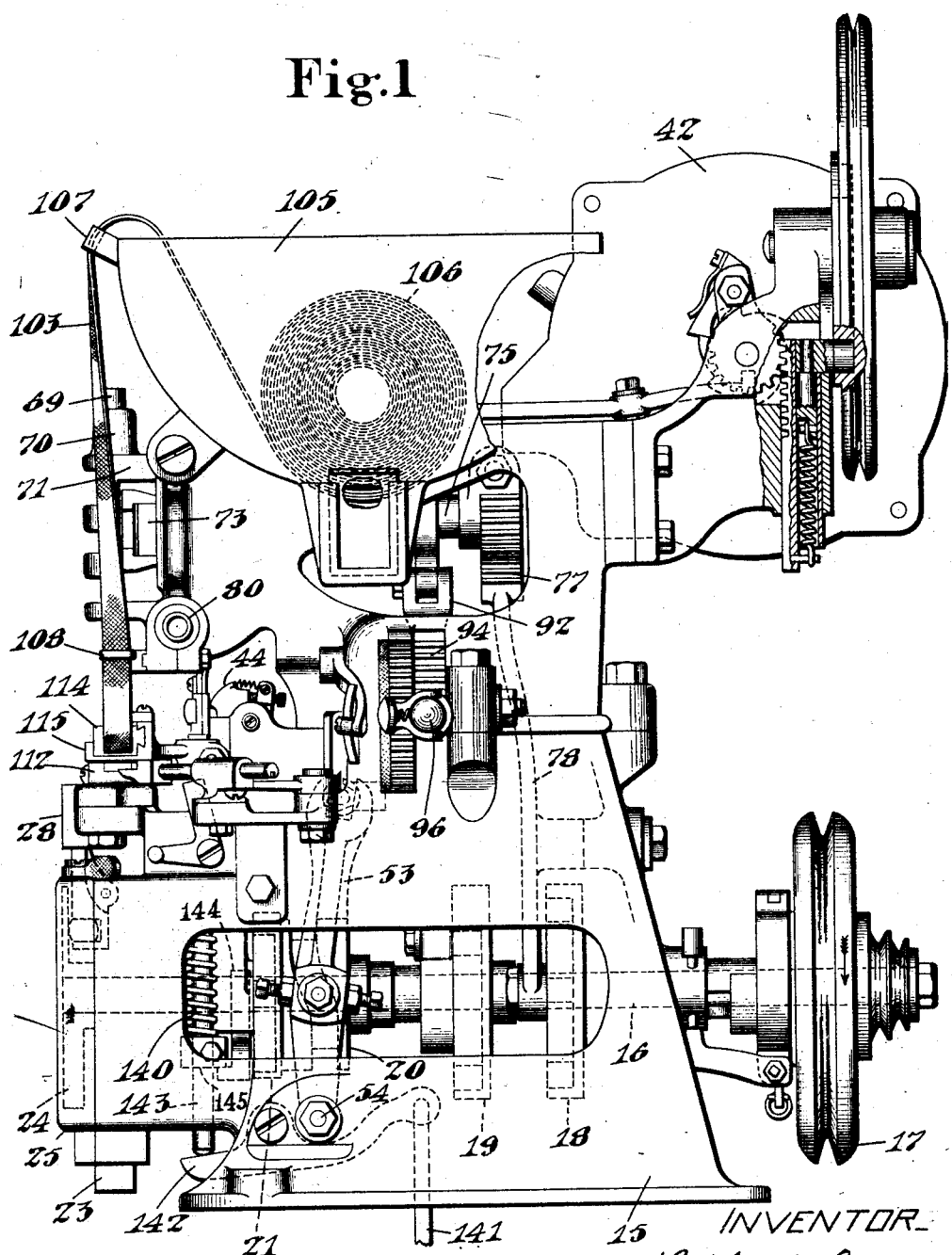
Fig. 1 is a right side elevation, partly in section, of a lacing-hook inserting machine embodying the present invention.

Referring to Fig. 1, the frame 15 of the machine is provided with bearings for a horizontal cam shaft 16 equipped with clutch mechanism including a continuously driven pulley 17. This shaft carries a cam 18 for operating the combined punch and clenching tool, hereinafter described, a cam 19 for operating regulatable work-feeding mechanism, a cam 20 for operating mechanism by which the lacing-hooks in the raceway are separated and delivered to the hook-inserting mechanism, a cam 21 for lifting the presser-foot 115, a cam 22 (Fig. 2) for operating the hook-inserting plunger 23, and a thin face-cam 24 for retracting the hook-supporting plate 29 from the throat of the clenched hook.

The plunger 23 is arranged to slide up and down in bearings formed in the frame 15 and is maintained in said bearings by a detachable cover plate 25 in which the cam 24 is nested (see Fig. 1) and which has so little protrusion in front of the plunger 23 as to present no obstacle to the lifting of the articles of work from the operator's lap to the fastening-inserting locality.

Figure 2:
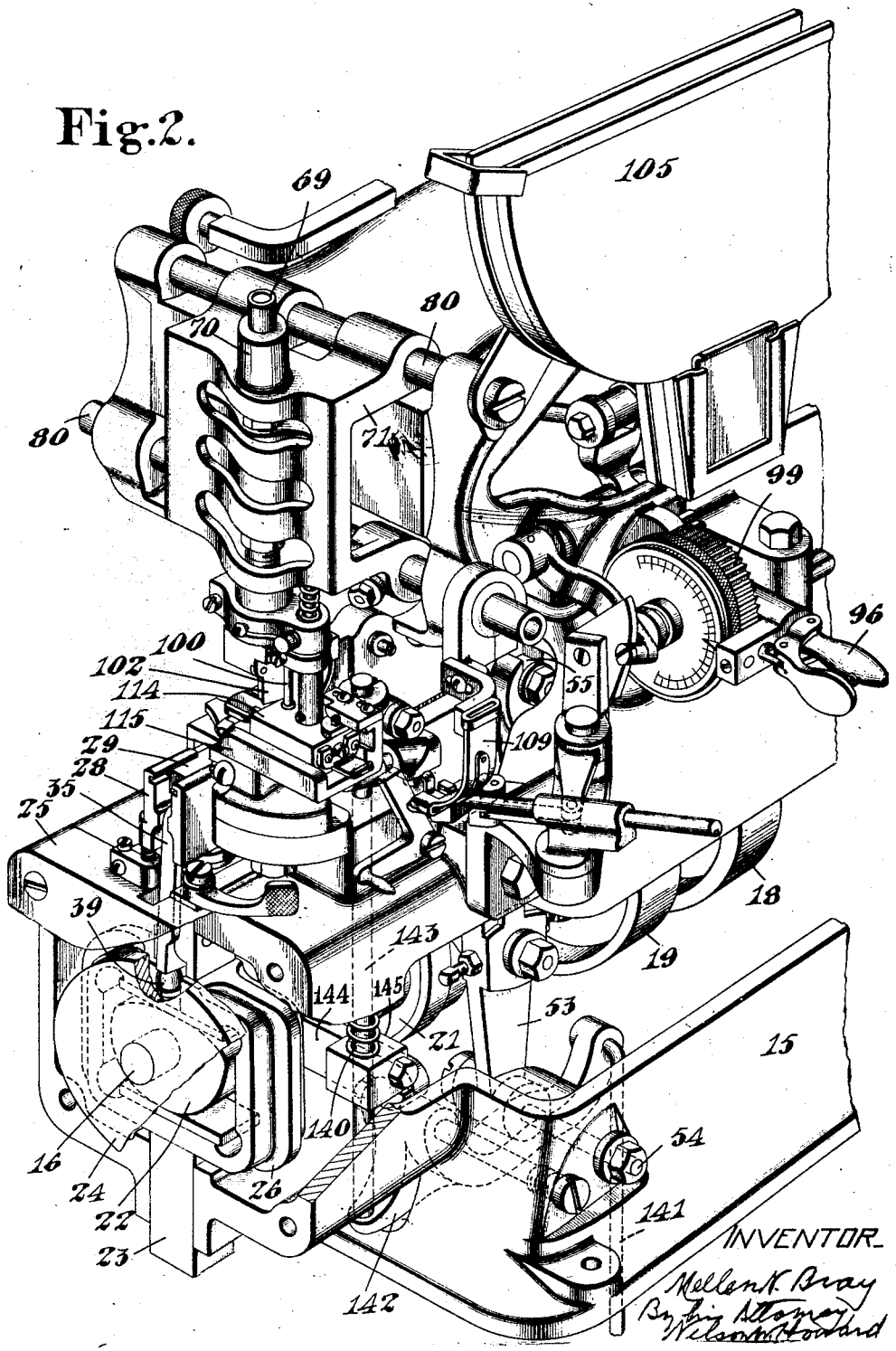
Fig. 2 is a perspective view of the front portion of said machine.

As shown by Fig. 2, the plunger 23 is formed with a yoke 26 in which the cam 22 operates to move it up and down. The upper portion of the plunger 23 is bored for the reception of a vertical stem 27 formed on a block 28 which carries a laterally movable hook-supporting plate 29. The stem 27 is retained in the plunger 23 by a screw 30 and is normally held down by a compression spring 31. A nut 32 screwed on a threaded portion 33 of the stem 27 provides for adjusting the block 28 up and down relatively to the plunger 23 to regulate the pressure with which the lacing-hooks are inserted and clenched. The block 28 is formed with horizontal grooves 34 in which opposite edges of the hook-supporting plate 29 may slide. The mid-section of the block 28 is cut out to receive the upper end of a lever 35 arranged to shift the plate 29 to the front and rear. This lever is carried up and down by the plunger 23 and is connected thereto by a pivot pin 36. The upper end of the lever 35 is straddled by teeth 37 formed on the bottom of the plate 29 and is normally drawn to the rear by the tension spring 38. A roll 39 set into the lower end of the lever 35 is engaged by the rear face of the cam 24, as shown in Fig. 1. The diameter of the cam 24 is sufficient to maintain contact with the roll 39 notwithstanding the fact that the lever 35 is carried up and down by the plunger 23, but the up and down movement of the lever has no effect on the position of the plate 29 relatively to the block 28. The rear edge of the plate 29 is provided with a notch 40 to receive the neck 41 (Fig. 11) of a lacing-hook which is deposited on the plate by mechanism hereinafter described.

Lacing-hooks are fed from a hopper 42 (Fig. 1) to an inclined raceway 43, portions of which are shown in Figs. 3, 4, 5, 6 and 11. This raceway conducts a series of lacing-hooks to an oscillatory separator 44 affixed to a pivot member 45. The leading lacing-hook of the series gravitates from the raceway 43 to the separator 44 and is temporarily supported by the latter, but at a suitable time in the cycle of operations the separator is turned in a counter-clockwise direction to release said lacing-hook, whereupon the latter slides down a supplemental raceway 46 the delivery end of which is horizontal. When the plunger 23 is in its lowest position it holds the plate 29 at the level of the delivery end of the raceway 46, and at this time the rear edge of the plate 29 is maintained in contiguous relation to said raceway by the spring 38.

Each lacing-hook, after gravitating to the delivery end of the raceway 46, is transferred from said raceway to the supporting plate 29 by a pusher 47. This pusher is carried by a horizontally movable plunger 48 arranged to slide in a bearing 49. The pusher 47 is nested in the plunger 48 and is adapted to yield relatively thereto to guard against breakage in case the raceway 46 is obstructed or the lacing-hook becomes wedged therein. A pin 50 carried by the plunger 48 extends through a recess 51 in the pusher 47 to provide a connection, and a compression spring 52 normally maintains the pusher in an advanced position relatively to the plunger. The plunger is reciprocated to the front and rear by the cam 20 and a lever 53 actuated thereby. The lower end of this lever is mounted on a stationary pivot member 54, and the upper end is formed with a forked portion which straddles a stud 55 projecting from a sleeve 56 loosely surrounding the rear portion of the plunger 48. A compressed spring 57 surrounds the plunger 48 between the sleeve 56 and a collar 58 affixed to the plunger, the spring being maintained under compression by a collar 59 affixed to the rear end of the plunger. Thus, when the lever 53 moves the sleeve 56 toward the front of the machine, its movement is transmitted to the plunger 48 by the spring 57 unless some obstruction prevents such movement of the plunger, in which case the movement of the sleeve 56 will be dissipated in further compression of the spring 57.

The movements of the plunger 48 are utilized also to operate the hook separator 44 through connections now to be described. A lug 60 formed on the collar 58 is arranged to engage a lever 61 loosely mounted on the pivot member 45. A screw 62 extending through the upper portion of the lever 61 is arranged to abut a portion of the hook separator 44 to transmit operating motion of the lever 61 to the separator. The separator is fixed to the pivot member 45 and is connected to the upper end of the lever 61 by a tension spring 63. An arm 64 is also affixed to the pivot member 45 and is normally held against a stop pin 65 by a tension spring 66. Thus, the separator 44 is normally maintained in the position shown in Fig. 11 by the spring 66 and the pin 65, and the lever 61 is normally held in the position shown in said figure by the spring 63 and the screw 62.

The mechanism just described operates as follows: When the plunger 48 is moved to the right from the position shown in Fig. 11, it not only retracts the pusher 47 from the raceway 46 but it also causes the lug 60 to turn the lever 61 and the separator 44 in a counter-clockwise direction against the tension of spring 66. Since the lower end of the lever 61 moves in an arc while the lug 60 moves in a straight line, these two parts lose contact with each other before the plunger 48 reaches the right-hand limit of its stroke. Consequently, the escape of the lever 61 from the lug 60 permits the spring 66 to return the separator 44 immediately to its initial position, thereby giving the separator a considerable period of dwell in its hook-receiving position. When the plunger 48 moves from right to left to transfer the separated lacing-hook to the supporting plate 29, the lug 60 once more engages the lever 61 and turns the latter in a clockwise direction against the tension of the spring 63. Here again, the arc of movement of the lower end of the lever 61 permits the lug 60 to pass under and beyond it so that the lever may be returned to its initial position by contraction of the spring 63. When a lacing-hook is delivered to the plate 29, the head of the hook lies under said plate and the barrel projects upwardly therefrom, as illustrated in Fig. 4.

Referring to Fig. 10, the fastener-inserting mechanism also comprises a tool for cooperating with the hook-supporting plate 29 to clench the hooks. This tool comprises a clenching portion 67 and a punch or pilot 68. The diameter of the punching portion 68 is smaller than the internal diameter of the barrel portion X (Figs. 4 and 11) of a lacing-hook but is sufficient for the purpose of punching holes in leather shoe uppers, since the leather will stretch readily to receive the barrel portions. The punch 68 cooperates first with the work-support or punch-bed and moves laterally therefrom for the purpose of feeding the work step by step to space the lacing hooks one from another. As shown in Fig. 10, said tool is affixed to the lower end of a plunger 69 and the latter is arranged to slide up and down in bearings 70 formed in a horizontally movable feed carriage 71. A cross-head 72 affixed to the plunger 69 is provided with a horizontal groove for the reception of a crank block 73. This block is bored for the reception of a crank or wrist pin 74 carried by a rock-shaft 75. A gear segment 76 fastened to the rear end of the rock-shaft meshes with a gear segment 77 at the upper end of an actuating lever 78 supported by a pivot member 79. A roll at the lower end of the lever 78 cooperates with the cam 18 and completes the train of mechanism by which the plunger 69 is actuated to punch holes in an upper 80 (Fig. 12) for the reception of the barrels of lacing-hooks.

The feed carriage 71 by which the plunger 69 is carried from side to side is connected to the frame 15 by two horizontal guide rods 80 and is reciprocated by a train of mechanism that receives motion from the cam 19 (Fig. 10). A connecting rod 81 is formed at its lower end with a guiding slot 82 through which the shaft 16 extends and is also provided with a cam roll 83 arranged in the groove of the cam 19. The upper end of the rod 81 is provided with a forked head which straddles an arm 84 of a bell-crank lever supported by and surrounding the rock-shaft 75. The arm 84 is formed with a slot 86 to receive an adjustable pivot connection 87 by which the rod 81 is operatively connected to the bell-crank lever. This lever includes also an arm 88 and a sleeve or hub portion 89 connecting the arms 84 and 88. The arm 88 is formed with a vertical groove for the reception of a block 90 pivotally connected to and carried by the feed carriage 71. The length of motion imparted by this mechanism to the feed carriage may be regulated by shifting the pivot connection 87 toward and from the axis about which the lever 84, 88, 89 oscillates, and to provide for such shifting the upper end of the connecting rod 81 is connected by a link 91 with a regulating lever 92. This lever is affixed to a rock-shaft 93 and is provided with a gear segment 94 engaged by a gear segment 95 formed on an adjusting handle 96. The handle is supported by a pivot member 97 and is maintained in various positions of adjustment by a spring-pressed retaining tooth 98 which plays over a stationary toothed segment 99.

The parts hereinbefore described operate in well-known manner to punch holes in an upper for the reception of the shanks of lacing-hooks, to feed the upper step by step and to insert and clench the lacing-hooks. In addition thereto and in accordance with a novel feature of the present invention, the machine is provided with a supplemental punch 100 (Fig. 8) arranged to punch holes in a strip 103 of reinforcing material automatically supplied for the purpose of reinforcing the anchorage of the lacing-hooks. The punch 100 is preferably larger in diameter than the punch 68 and is carried by a block 101 affixed to the plunger 69 (Fig. 4). The block 101 also carries a cutter 102 arranged to sever the strip 103 into individual sections 104 (Fig. 12 and 13). As shown in Fig. 1, a receptacle 105 is provided for a roll or coil 106 of reinforcing material in which form the strip 103 is supplied to the trade. This material is a relatively thick and tough woven fabric made of cotton, and is non-elastic. It is commonly impregnated with a paste by which it is rendered moderately stiff so that it will not wrinkle or bend too easily. As the strip 103 leaves the receptacle 105, it passes through a guide 107 and is drawn downwardly through a guide 108. From the latter it is drawn along a curved segmental guide 109 having an eye 110 at its lower end and also having a leaf spring 111 which cooperates with the eye 110 to maintain a light clamping pressure on the strip. From the eye 110, which is slightly above the level of the work support and punch-bed 112, the strip 103 passes through a guiding channel 113 (Fig. 9) in a sectional block 114. The bottom section of this block provides a punch-bed with which the punch 100 cooperates to punch fastener-receiving holes in the strip 103, but preferably a hole 117 extends through the block and intersects the channel 113 to receive the punch 100. Thus, as shown in Fig. 8, these elements provide a punch-and-die couple adapted to punch clean-cut holes in the reinforcing material independently of the work 80. Figs. 7 and 8 show the punch as having just completed a punching operation.

The block 114 is supported by a presser-foot 115 which cooperates in well-known manner with the punch-bed 112 to clamp and release the upper 80 periodically, but in addition to being moved up and down by the presser-foot the block 114 is connected with the feed carriage 71 so that it partakes also of the horizontal reciprocations of said carriage for the purpose of feeding the strip 103. The block 114 is therefore formed with a dovetail portion 116 which slides in a groove of corresponding shape formed in the presser-foot. The connection by which the block 114 is caused to move back and forth with the carriage 71 maintains not only the cooperative relation of the punch-and-die couple but also maintains the left-hand end of the block in contact with the cutter 102. Thus, the cutter 102 and block 114 constitute a shearing couple by which the individual sections 104 are severed with a clean cut.

The block 114 is maintained in cooperative relation to the punch 100 and the cutter 102 by a collar 118 fastened to the feed carriage 71 and by a hollow, vertical pin 119 (Fig. 5). This pin is not affixed to the collar 118 but is adapted to slide vertically therein as required by the up and down movements of the presser-foot. The pin also extends through and slides in a bearing in the block 101 and its lower end projects into a cavity 120 in the block 114. A compression spring 121 seated against the pin 119 and against a wall of the cavity 120 maintains pressure of the block 114 against the severing cutter 102, and a screw 122 screwed into the block 114 enters a cavity in the pin 119 to maintain connection of said pin with said block. A compression spring 123 is seated against an under surface of the feed carriage 71 and maintains downward pressure on the pin 119. This spring loosely surrounds a supplemental guiding pin 124 which is affixed to the carriage 71 and is arranged in telescopic relation to the hollow pin 119. A supplemental compression spring 125 is seated against the lower end of the pin 124 and maintains additional downward pressure on the hollow pin 119.

Figure 3:
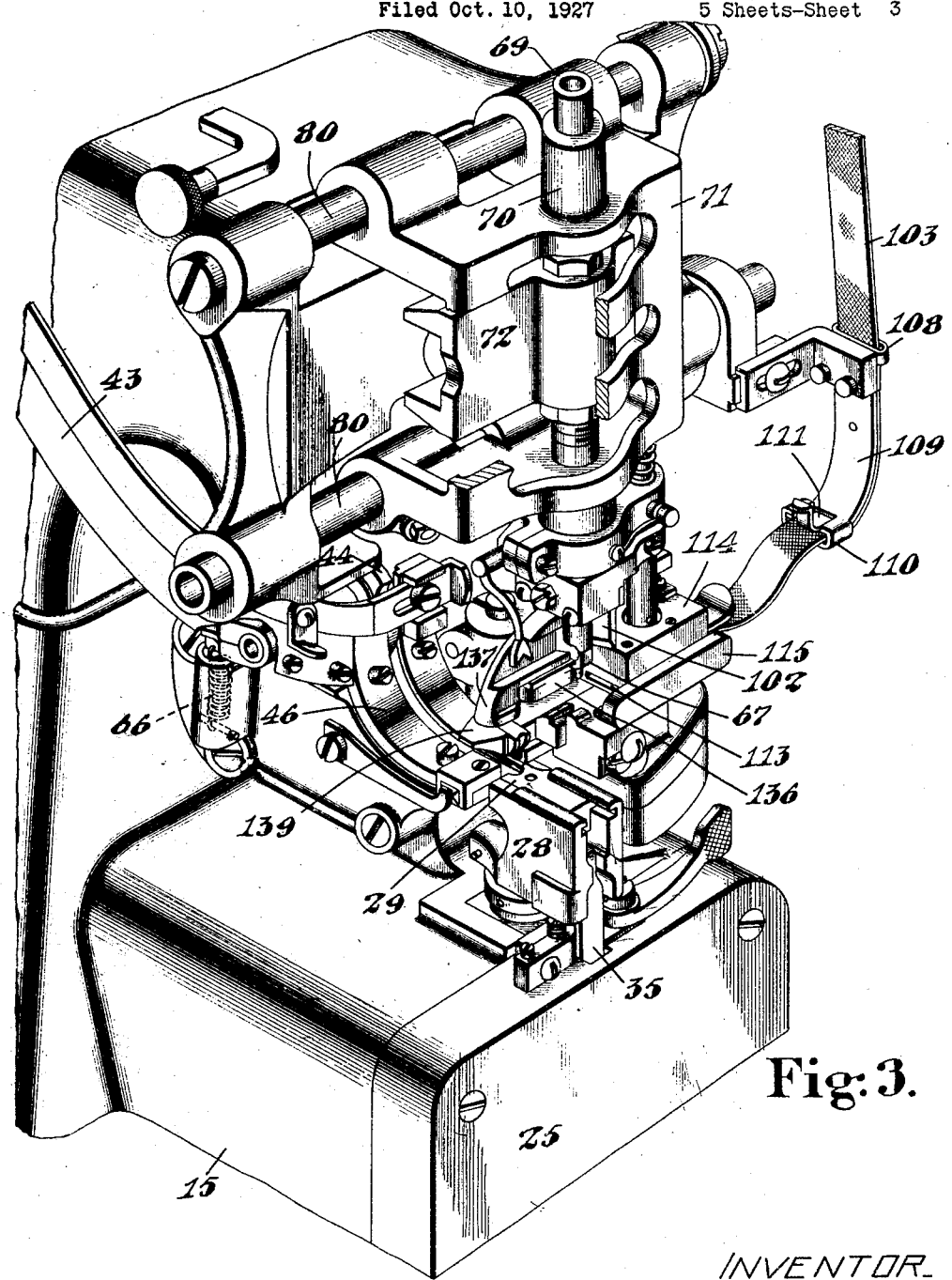
Fig. 3 is a perspective view of said front portion from another point of view.

When the parts occupy their initial positions, as shown in Figs. 2, 3 and 4, the punching plunger 69 is raised, the presser-foot 115 is depressed by a heavy spring 140 (Figs. 1 and 2) against the work support 112, and the lower plunger 23 is at its lowest position where the hook-supporting plate 29 is in register with the delivery end of the raceway 46. At this stage a lacing-hook is on the plate 29, having just been deposited thereon by the pusher 47 (Fig. 11). Assuming that the machine has previously executed at least one cycle to punch and feed the reinforcing strip 103, the leading end of the latter will project from the left-hand end of the block 114 and will be provided with a punched hole in register with the punch 68 of the combined punching and clenching tool carried by the plunger 69. If, now, an upper 80 is clamped upon the punch-bed 112 by the presser-foot, and the machine is set in operation by tripping the clutch comprising the continuously driven pulley 17 (Fig. 1), the machine will operate as follows: First the upper plunger 69 descends, thereby causing the punch 68 to enter the hole previously punched in the leading end of the strip 103, the plunger continuing to descend until the punch 68 reaches the work support 112 and thereby punches a hole in the upper. See Fig. 5. At this instant the presser-foot is lifted by a train of mechanism (Figs. 1 and 2) including the cam 21, a cam lever 144, and a collar 145 affixed to the stem 143 of the presser-foot, thereby releasing the upper, which is now impaled by the punch 68, and causing the cutter 102 and the block 114 to shear off the projecting portion of the strip 103, which is also impaled by the punch 68. The lifting of the presser-foot also causes the punch-and-die couple to punch another hole in that portion of the strip that will subsequently provide the next individual section 104. See Figs. 5 and 8. The diameter of the punch 100 is preferably larger than that of the punch 68 and as large as the outside diameter of the barrels of the lacing-hooks. The severed section 104 of reinforcing material now lies upon the upper 80 and surrounds the punch 68. Immediately after the plunger 69 has completed its punching stroke the wrist-pin 74 (Fig. 10) moves slightly past bottom center to relieve the pressure of the punch 68 against the work-support 112. Having passed the dead-center position, the wrist pin dwells while the feed carriage 71 moves from right to left, the combined punch 68 and set 67 being thereby shifted into register with the hook that lies on the supporting plate 29.

As the feed carriage 71 moves from right to left it feeds not only the upper but also the reinforcing strip 103 which, at this time, is impaled by the punch 100 and is also gripped by other means hereinafter described. During the feeding of the upper and the strip 103 the lower plunger 23 starts to rise with a lacing-hook lying on the plate 29, but before the lacing-hook rises to the level of the work the combined punch and set is registered therewith and dwells until the upcoming hook is inserted and clenched, as illustrated in Fig. 6. At this stage the presser-foot descends to clamp the upper upon the work support, and at the same time the upper plunger 69 rises to retract the punch 68 from the clenched hook. While the plunger 69 is rising, but after the presser-foot has descended, the cam 24 actuates the lever 35 to retract the hook-supporting plate 29 from the throat of the clenched hook. This result having been accomplished, the feed carriage 71 moves from left to right and the lower plunger 23 descends to receive another hook.

Although the feed carriage feeds the upper 80 and the reinforcing strip 103 coextensively, the invention provides means for moving the leading end of the reinforcing strip a relatively short distance in the opposite direction for the sake of avoiding waste of reinforcing material. The feature by which this is accomplished is adapted to produce individual sections 104 of reinforcing material all of uniform length irrespective of changes in the amplitude of the feeding strokes imparted to the carriage 71 and the upper 80. As shown in Figs. 4, 6 and 9, the sliding block 114 is provided with a bore in which a spur 126 is arranged, said spur having a pointed lower end and a head 127 at its upper end. A light compression spring 128 is arranged in said bore to maintain upward pressure against the head 127 and thereby retract the pointed end of the spur normally from engagement with the reinforcing strip 103. The spur is retained in said bore by a screw 129 the head of which overlaps the head 127. As the block 114 slides from left to right relatively to the presser-foot 115, it carries the head of the spur 126 into engagement with a cam surface 130 formed on a plate 131. This plate is fixed to the presser-foot by two screws 132 (Fig. 6) and is horizontally adjustable relatively to the presser-foot by reason of slots 133 formed in the plate for their reception. In moving from left to right the spur 126 is depressed by the cam surface 130 and rides on the under surface of the plate 131, but never moves beyond the right hand end of the latter. The effect of depressing the spur is to force its pointed end into the reinforcing strip 103 (Fig. 4) so that the strip becomes securely locked to the block 114 and is thereby compelled to move with it. This accounts for the slack condition of the strip 103, as shown in Figs. 4 and 5, between the tension device 111 and the block 114.

The operation of the spur 126 is as follows: Assuming the parts to be in their initial positions, as shown by Fig. 4, and that the feed carriage 71 moves from right to left in conformity with the cycle of operations hereinbefore described, the leading end of the strip 103 will move with, and to the same extent as, the carriage 71. When this movement of the carriage begins, the presser-foot is raised and the spur 126 is depressed so that it maintains a grip upon the strip in addition to the hold which the punch 100 has on the strip. Before the feed carriage 71 reaches the left-hand limit of its feeding stroke the spur 126 is released by the plate 131, and at the point where this release occurs the spur is retracted from the strip 103 by the compression spring 128. Nevertheless, the strip remains interlocked with the sliding block 114 since it is still impaled by the punch 100. When, after the feeding stroke has been completed and the lacing-hook has been inserted and clenched, the presser-foot 115 descends and the plunger 69 retracts both the punch 68 and the punch 100, the reinforcing strip is momentarily released from all connection with the feeding means, although it still extends loosely through the channel 113 in the block 114. Now, as the feed carriage 71 moves from left to right in returning to its initial position, its first stages of such movement produce no change in the position of the strip 103, since the latter is clamped by the tension elements 110 and 111 and the strip has sufficient stiffness to resist whatever slight friction is exerted upon it by the block 114 through which it extends. In due course, however, the head of the spur 126 again encounters the stationary cam surface 130 and is thereby depressed to force the pointed end of the spur into the strip, the block 114 continuing to move to the right to a greater or less extent, according to the length of feeding motion for which the regulatable work-feeding mechanism is adjusted. It is to be understood that adjustments of the work-feeding mechanism do not affect the left-hand limit of movement of the feed carriage 71 but affect only the right-hand limit. Thus, the spur 126 will always be depressed into engagement with the strip 103 at the same point, although further movement to the right will be increased or decreased by regulation of the work-feeding mechanism. Consequently, the leading end of the strip will project in every case the same distance beyond the left-hand end of the sliding block 114 when the spur 126 is depressed by the cam 130, and any subsequent movement of the block to the left or right will cause the leading end of the strip to move with it. That portion of the strip that lies between the sliding block and the tension members 110 and 111 will therefore be buckled more or less as shown in Figs. 4 and 5. The slots 133 formed in the cam plate 131 provide for adjusting said plate so that the spur 126 will grip the strip 103 at the instant when the previously punched hole in the leading end of the strip is in register with the punch 68.

If it is desired to apply a reinforcing strip without severing it into individual sections, that result may be obtained by substituting a shorter cutter for the cutter 102 and detaching the cam plate 131 from the pressure-foot. Then, when the presser-foot is lifted by its cam 21 it will punch a hole in the strip 103 as already described, but will not raise the strip far enough to sever it. Moreover, the spur 126 will remain out of contact with the strip and the latter will be fed with the same amplitude as the article of work 80. With the shorter cutter the strip may be severed by manually lifting the pressure-foot between the last and the second last cycles of a series, at which time the automatic operation of the machine will be momentarily interrupted by disconnecting the driving clutch. Such manual operation of the presser-foot may be effected by a treadle (not shown) and connections which, as shown in Figs. 1 and 2, comprise a treadle rod 141, a lever 142 and the presser-foot stem 143. The lever 142 affords a greater lift than the cam 21 to accomplish this result. Following such manual severing, one more cycle of the machine will insert a fastener in the one remaining hole previously punched in the severed and partially attached portion of the strip.

Referring to Fig. 9, the presser-foot 115 is formed with a recess 135 to clear the edge gage 136 shown in Fig. 3, and at the same time to provide the presser-foot with two spaced work-engaging portions 137 and 138. Thus, while the edge gage is affixed to the work support 112 it is also nested in the presser-foot between the portions 137 and 138. The portion 137 is arranged to clamp the work behind and in line with the fastener-inserting locality while the edge gage is arranged to engage the work behind and in line with the punching locality. These two work-engaging portions of the presser-foot, located respectively at the left and right of the edge gage, guard against accidental skewing of the work and insure punching the holes in the upper and inserting the fasteners at points uniformly distant from that edge of the upper which is held against the edge gage. Moreover, since the clamping portion 137 co-operates with a portion 139 of the work support directly behind the hook-inserting locality it guards against skewing that might otherwise result from retracting the hook-supporting plate 29 from the clenched hook, particularly when a chip, a thick deposit of enamel on the hook, or a malformation of the hook, causes a tight fit of the plate 29 in the throat of the hook.

Having thus described my invention, what I claim as new and desire to secure by Letters Patent of the United States is:

1. A fastener-inserting machine comprising fastener-inserting mechanism, mechanism for feeding an article of work to space the fasteners inserted therein, means arranged to punch fastener-receiving holes in a strip of reinforcing material exclusively and at points out of register with said fastener-inserting mechanism, and means arranged to feed such strip to place the punched holes successively in register with an element of said fastener-inserting mechanism so that the fasteners inserted into said article will be inserted also through the holes punched as aforesaid.

2. A fastener-inserting machine comprising fastener-inserting mechanism, mechanism for feeding an article of work to space the fasteners, punching means including a punch-and-die couple arranged to punch fastener-receiving holes successively in a strip of reinforcing material, and means arranged to feed such strip to place the punched holes successively in register with an element of said fastener-inserting mechanism so that the inserted fasteners will pass through such holes.

3. A fastener-inserting machine comprising fastener-inserting mechanism, mechanism for feeding an article of work to space the fasteners, means arranged to punch fastener-receiving holes in a strip of reinforcing material exclusively, and means arranged to feed the punched strip so that the fasteners inserted into said article by said fastener-inserting mechanism will pass through the holes punched as aforesaid.

4. A fastener-inserting machine comprising fastener-inserting mechanism, two separate punches one arranged to punch fastener-receiving holes in an article of work and the other arranged to punch such holes exclusively in a strip of reinforcing material, and mechanism arranged to feed the article of work and the punched reinforcing material to place the punched holes of both in a common fastener-receiving position.

5. A fastener-inserting machine comprising two punch-beds, one for an article of work and the other for a strip of reinforcing material, a reciprocatory plunger, two punches carried by said plunger and arranged to co-operate with said punch-beds respectively, means for relatively moving the article of work and the strip of reinforcing material to register the holes made by said punches, and means arranged to insert a fastener through the holes punched and registered as aforesaid.

6. A fastener-inserting machine comprising fastener-inserting mechanism including a plunger, two separate punches both carried by said plunger and arranged one to punch fastener-receiving holes in an article of work and the other to punch fastener-receiving holes exclusively in a strip of reinforcing material, and means arranged to feed said article and said strip to place the punched holes of said article and said strip in a fastener-receiving position and to space the fasteners.

7. A fastener-inserting machine comprising fastener-inserting mechanism, two separate punches of different diameters arranged one to punch fastener-receiving holes in an article of work and the other to punch fastener-receiving holes exclusively in a strip of reinforcing material, and means arranged to feed said article and the punched strip to place the punched holes of the article and of the strip in a common fastener-receiving position and to space the fasteners.

8. A fastener-inserting machine comprising two separate punches of different diameters, of which the smaller is arranged to punch fastener-receiving holes in an article of work and the larger to punch such holes exclusively in a strip of reinforcing material, means arranged to feed said article and said strip to space the holes made by said punches, and mechanism arranged to apply said reinforcing material to said article by inserting fasteners successively through the punched holes in both.

9. A fastener-inserting machine comprising fastener-inserting mechanism having a combined punch and setting tool arranged to punch a fastener-receiving hole in an article of work, means arranged to punch a fastener-receiving hole exclusively in a strip of reinforcing material out of register with said punch, and means arranged to feed said strip to place a punched hole therein in register with said combined punch and setting tool.

10. A fastener-inserting machine comprising fastener-inserting mechanism having a combined punch and setting tool arranged to punch a fastener-receiving hole in an article of work, a punch-and-die couple arranged to punch a fastener-receiving hole exclusively in a strip of reinforcing material out of register with said combined punch and setting tool, and means arranged to feed said strip to place a hole punched by said punch-and-die couple in register with said combined punch and setting tool.

11. A fastener-inserting machine comprising a combined punch and setting tool arranged to punch a fastener-receiving hole in an article of work, a punch-and-die couple having a larger punching diameter than that of said combined punch and setting tool and arranged to punch a fastener-receiving hole exclusively in a strip of reinforcing material out of register with said tool, means arranged to feed said strip to place a hole punched by said punch-and-die couple in register with said combined punch and setting tool, and means arranged to co-operate with said tool to insert a fastener through a hole punched in said article by said combined punch and setting tool and through a hole punched in said reinforcing material by said punch-and-die couple.

12. A fastener-inserting machine comprising a support for an article of work, a presserfoot arranged to cooperate with said support to clamp said article, a punch-bed carried by said presserfoot, a punch arranged to co-operate with said punch-bed to punch a fastener-receiving hole exclusively in a strip of material for reinforcing said article of work, means arranged to feed said strip to remove a hole punched therein from register with said punch-bed, and mechanism arranged to insert a fastener through said article of work and through such hole in said reinforcing material.

13. A fastener-inserting machine comprising a support for an article of work, a retractory presserfoot arranged to cooperate with said support to clamp said article, a punch-and-die couple arranged to punch a fastener-receiving hole exclusively in a strip of material for reinforcing said article, the die member of said couple being carried by said presserfoot to utilize retractory movement of the latter to effect such punching, means arranged to feed said strip to remove a hole so punched from register with said die member, and mechanism arranged to insert a fastener through said article and through such hole in said reinforcing material.

14. A fastener-inserting machine comprising a support for an article of work, fastener-inserting mechanism, a presserfoot and mechanism for operating it to clamp and release the article of work on said support, means arranged to feed a strip of reinforcing material to said fastener-inserting mechanism, means operated by refractory movement of said presserfoot to punch fastener-receiving holes successively in said strip, and means also operated by retractory movement of said presserfoot to sever a section of said strip behind a hole previously punched therein.

15. A fastener-inserting machine comprising a support for an article of work, fastener-inserting mechanism, a presserfoot and mechanism for operating it to clamp and release the article of work on said support, means arranged to feed a strip of reinforcing material to said fastener-inserting mechanism, a punching couple arranged to punch fastener-receiving holes successively in said strip, and a severing couple arranged to sever punched sections of said strip successively, one member of each of said couples being carried by said presserfoot to utilize the retractory movements of the latter to punch said holes and sever said sections.

16. A fastener-inserting machine comprising a work-support, a presserfoot and mechanism for operating it to clamp and release an article of work on said work-support, a die carried by said presserfoot, a plunger, two punches carried by said plunger, one of said punches being arranged to operate against said work-support to punch fastener-receiving holes successively in an article of work lying thereon, and the other one of said punches being arranged to cooperate with said die to punch fastener-receiving holes successively in a strip of reinforcing material, means arranged to feed said article of work and said strip, and mechanism arranged to apply said reinforcing material to said article of work by inserting fasteners successively through both and in the holes made by said punches respectively.

17. In a fastener-inserting machine comprising a work-support, and a four-motion plunger arranged to punch fastener-receiving holes in an article of work, feed such article and clench fasteners therein, a presserfoot and mechanism arranged to operate it to clamp and release such article of work, a punch-and-die couple arranged to punch fastener-receiving holes exclusively in a strip of reinforcing material, the members of said couple being carried respectively by said plunger and said presserfoot and being arranged to utilize the work-feeding movement of said plunger to feed said strip, and mechanism arranged to apply said reinforcing material to the article of work by inserting fasteners successively through both and in the holes made by said plunger and said punch-and-die couple respectively.

18. In a fastener-inserting machine having a combined punch and setting tool movable to punch fastener-receiving holes successively in an article of work and also movable to feed such article, means arranged to sever a strip of reinforcing material adjacent to said combined punch and setting tool, and means arranged to punch fastener-receiving holes exclusively in said strip and to feed the latter to carry the punched holes therein successively past said severing means and into register with said combined punch and setting tool.

19. In a fastener-inserting machine having regulatable work-feeding mechanism, mechanism arranged to insert fasteners successively into an article of work, and a presserfoot movable periodically to clamp and release the work, a punch-and-die couple arranged to punch fastener-receiving holes successively in a strip of reinforcing material adjacent to but out of contact with said article of work, one member of said couple being carried by said presserfoot, and both members of said couple being arranged to partake of the work-feeding movement of the first said mechanism to feed said strip so that the holes punched by said couple will receive the inserted fasteners.

20. In a fastener-inserting machine having regulatable work-feeding mechanism, mechanism arranged to insert fasteners successively into an article of work, and a presserfoot movable periodically to clamp and release the work, a punch-and-die couple arranged to punch fastener-receiving holes successively in a strip of reinforcing material adjacent to but out of contact with said article of work, one member of said couple being carried by said presserfoot, and both members of said couple being arranged to partake of the work-feeding movement of the first said mechanism to feed said strip so that the holes punched by said couple will receive the inserted fasteners, means arranged to sever said strip into sections, and means arranged to regulate the feeding of said strip independently of regulation of the first said mechanism.

21. In a fastener-inserting machine having work-feeding mechanism, mechanism arranged to insert fasteners successively into an article of work, and a presserfoot movable periodically to clamp and release the work, means arranged to feed a strip of reinforcing material to receive the fasteners inserted into the work, means arranged to sever said strip into individual sections, one for each of said fasteners, cooperative gripping members carried by said presserfoot and connected to said work-feeding mechanism to be reciprocated by the latter relatively to said presser foot, said gripping members being arranged to grip and release said strip, and means affixed to said presserfoot to effect relative gripping and releasing movement of said gripping members in consequence of reciprocatory motion imparted to the latter by said feeding mechanism, whereby said gripping members impart a relatively short recessional movement to said strip after each feeding movement of the latter.

22. In a fastener-inserting machine having a reciprocatory carriage for feeding an article of work, mechanism for inserting fasteners successively into said article, and a presserfoot movable periodically to clamp and release said article, a block carried by but movable relatively to said presserfoot and coupled to said carriage to partake of the latter's reciprocations, means arranged to cooperate with said block to feed a strip of reinforcing material to said fastener-inserting mechanism, means arranged to cooperate with said block to sever said strip into individual sections, a spur carried by said block, and a member adjustably fixed to said presser-foot to force said spur into said strip during the recessional movement of said block and thereby impart a recessional movement to the strip after each feeding movement thereof.

23. In a fastener-inserting machine having a reciprocatory carriage for feeding an article of work, and mechanism for inserting fasteners successively into said article, a presserfoot having a cam surface, a block carried by but movable relatively to said presserfoot and coupled to said carriage to partake of the latter's reciprocations, means arranged to cooperate with said block to feed a strip of reinforcing material to said fastener-inserting mechanism, means arranged to cooperate with said block to sever said strip into individual sections, and a member carried by said block and arranged to be operated by said cam surface to grip said strip at an intermediate point in the return stroke of said block and thereby cause a reverse movement of the leading portion of said strip and a corresponding reduction in the length of the severed sections of the strip.

24. In a fastener-inserting machine having a reciprocatory carriage for feeding an article of work, and mechanism for inserting fasteners successively into said article, a presserfoot for periodically clamping and releasing said article of work, means carried by said presserfoot and operated by said carriage to feed a strip of reinforcing material to said fastener-inserting mechanism, means arranged to sever said strip to provide individual sections of reinforcing material, and means carried by said presserfoot to grip and release said strip periodically and to retract said strip a relatively short distance after each feeding movement imparted to the strip.

25. In a fastener-inserting machine having a punch-bed, a presserfoot arranged to clamp and release an article of work lying on said punch-bed, and a plunger movable toward and from said punch-bed, two separate punches and a cutter carried by said plunger, one of said punches being arranged to cooperate with said punch-bed to punch a fastener-receiving hole in said article of work, means arranged to cooperate with the other one of said punches to punch a fastener-receiving hole exclusively in a strip of reinforcing material, means arranged to cooperate with said cutter to sever a punched portion of said strip, and mechanism arranged to apply the severed portion of said strip to said article of work by inserting a fastener through both and through the holes formed by said punches respectively.

26. A fastener-inserting machine having means for punching a fastener-receiving hole in an article of work, means for punching a slightly larger hole in a piece of reinforcing material, means for presenting the work piece and the reinforcing material in fastener-receiving position with the holes in alinement, and means for inserting a fastener through the alining holes and clenching it upon a surface of the reinforcing material.

27. A fastener-inserting machine having a punch arranged to form a fastener-receiving hole in an article of work, a punch formed and arranged to punch a slightly larger hole in a piece of reinforcing material, and means for inserting a fastener through the hole in the article and through the hole in the reinforcing material.

28. A fastener-inserting machine comprising a stationary punch-bed, a presserfoot arranged to clamp an article of work thereon, a movable punch-bed carried by said presserfoot, means arranged to feed a strip of reinforcing material over said movable punch-bed, means arranged to cooperate with said movable punch-bed to punch a fastener-receiving hole in said strip, means arranged to cooperate with said stationary punch-bed to punch a fastener-receiving hole in the article of work, and means arranged to insert a fastener through both holes punched as aforesaid.

29. In a lacing-hook-setting machine having a work-support, and a hook-inserting member arranged to occupy the throat of the lacing-hook during the inserting operation and to withdraw from said throat after said operation, a presserfoot having two work-engaging portions spaced apart, and an edge-gage arranged between said portions, one of said portions being arranged to cooperate with said work-support behind the hook-inserting locality to clamp the work in line with said hook-inserting member during the withdrawing movement of the latter from the throat of the inserted hook.

30. In a lacing-hook-inserting machine having a work-support, a member arranged to punch a hook-receiving hole in the work at one locality, and a member arranged to insert a lacing-hook at another locality and to occupy the throat of the lacing-hook during the inserting operation and to withdraw from said throat after said operation, a presserfoot having two work-engaging portions spaced apart, and an edge-gage arranged between said portions and also arranged behind and in line with said punching locality, one of said portions being arranged to cooperate with said work-support behind said hook-inserting locality to clamp the work in line with said hook-inserting member during the withdrawing movement of the latter from the throat of the inserted hook.

31. In a lacing-hook-inserting machine having a plunger and a plate carried thereby for supporting and inserting a lacing-hook, a cam for retracting said plate from an inserted lacing hook, and a lever carried by said plunger and arranged to engage said cam and said plate to communicate motion from one to the other.

32. In a lacing-hook-inserting machine having a vertically movable plunger and a horizontally movable plate carried thereby for supporting and inserting a lacing-hook, a rotary face cam, and a substantially straight lever carried by said plunger and arranged to engage said cam and said plate to retract the latter from the throat of an inserted lacing-hook.

33. In a lacing-hook-inserting machine having a vertically movable plunger and a horizontally movable member carried thereby for supporting and inserting a lacing-hook, a thin rotary face cam arranged in front of said plunger for retracting said member from the throat of an inserted lacing-hook, and a lever carried by said plunger and arranged to communicate motion from said cam to said member, said cam and said lever being continuously in engagement with each other.

In testimony whereof I have signed my name to this specification.

MELLEN N. BRAY.